United States Patent [19]

Miyadera

[11] Patent Number: 4,691,960
[45] Date of Patent: Sep. 8, 1987

[54] CONSOLE BOX FOR AUTOMOBILE

[75] Inventor: Kazuhiko Miyadera, Toyota, Japan

[73] Assignee: Toyota Jidosha Kabushiki Kaisha, Aichi, Japan

[21] Appl. No.: 854,769

[22] Filed: Apr. 23, 1986

[30] Foreign Application Priority Data

Apr. 25, 1985 [JP] Japan .................................. 60-62544

[51] Int. Cl.$^4$ .............................................. B60R 7/00
[52] U.S. Cl. .................... 296/37.8; 403/341; 403/345
[58] Field of Search ................ 296/1 R, 37.8, 37.14; 403/341, 345; 180/89.1, 89.11, 90

[56] References Cited

U.S. PATENT DOCUMENTS

| | | | |
|---|---|---|---|
| 3,990,322 | 11/1976 | Hoffmann | 296/37.14 |
| 4,453,759 | 6/1984 | Kathiria | 296/37.8 |
| 4,518,172 | 5/1985 | Bortz et al. | 180/90 |
| 4,559,868 | 12/1985 | Nonaka et al. | 180/90 |
| 4,568,117 | 2/1986 | McElfish et al. | 296/37.8 |

Primary Examiner—Robert R. Song
Attorney, Agent, or Firm—Parkhurst & Oliff

[57] ABSTRACT

A console box for an automobile divided into first and second blocks. A first block is secured to an automotive body and comprises an inward flange formed at the upper edge of its opening, and a boss on the inner surfaces of two side skirt portions of the opening of the first block having an upper generally horizontal flat surface. A second block is provided with an upward groove formed in an extending flange at the upper end of the opening of the second block for closely engaging the inward flange of the first block. The second block further has L-shaped guide ribs having at the rear, a downward flat portion contacting closely with the upper flat portion of the bosses of the first block. The blocks are coupled by engaging the downward flange and the upward groove, contacting the upper flat portion of the bosses and the downward flat portion of the guide ribs and screw clamping the superposed portions of the openings of the blocks. Thus, the console box improves workability during assembly. Further, the positioning of the blocks in longitudinal, elevational and transverse directions during assembly is simply and readily achieved merely by coupling the blocks.

8 Claims, 8 Drawing Figures

CONSOLE BOX FOR AUTOMOBILE

BACKGROUND OF THE INVENTION

This invention relates to a combination structure of a console box of the split type for an automobile.

A known console box for an automobile has a structure including members which are divided longitudinally in the front and rear direction and laterally to the right and left. These members are integrally coupled to improve efficiency during assembly of the automobile.

The divided members of the known console box are composed of, for example, as shown in FIGS. 5(A) and 5(B), a front block (A) formed substantially in an inverted U-shaped cross section opened at one end and secured to an automotive body, a boss (B) projected inwardly from the ceiling surface of the block, a rear block (C) formed in the same shape as the front block (A) and a rib (D) formed on the front surface of the opening of the block (C). A mounting hole (E) is perforated at the upper surface of the rib (D) for inserting the boss (B) of the front block (A), and case nuts (H) are mounted at the positions corresponding to mounting seats (G) formed at both sides of the front block (A) at both sides of the rib (D). The block (A) and the block (C) are integrally fixed by contacting the end (F) of the block (A) with the end of the block (C), inserting the boss (B) of the block (A) into the mounting hole (E) of the rib (D) and further clamping with screws, the case nuts (H) with the seats (G).

In the structure shown in FIGS. 5(A) and 5(B), since the block (A) and the block (B) are difficult to position for coupling in the longitudinal, lateral and elevational directions, the assemblying work frequently depends upon the skill of line workers and the efficiency of the assembling work of the console box is decreased.

SUMMARY OF THE INVENTION

Accordingly, an object of this invention is to provide a console box for an automobile which can simply and completely position the blocks of a divided console box in the longitudinal, lateral and elevational directions when assembling the divided console box to improve the efficiency of the assembling work of the console box.

In order to achieve the above and other objects, there is provided according to this invention, a console box divided into front and rear blocks for an automobile comprising a front block secured to an automotive body and a rear block coupled with the front block. A flange is formed on a rear edge of the front block. Bosses are formed on an inner surface of the front block, having an upper flat surface in a generally horizontal plane. An extending flange is formed on a front edge of the rear block 3. A groove is formed on an upper surface of the extending flange for engaging with the flange of the front block. Guide ribs having a surface contacting with the upper surface of the bosses are provided on side wall portions of the rear block. The front and rear blocks of the console box are integrally coupled in position by engaging the flange with the groove, and contacting the upper flat surfaces of the bosses with the surface of the guide ribs.

The console box of the present invention is assembled in the following manner. A flange formed at the opening (rear edge) of a front block fixed to an automotive body is contacted with the opening of a rear block, and the flange of the front block is engaged with an upward groove formed on the front side of the opening of the rear block. Inverted L-shaped guide ribs provided at the side walls of the rear block are positioned near the flat surfaces of the bosses of the front block and the rear block is pivoted horizontally. As a result, the flange is closely inserted into the groove, and the downward flat surface of the inverted L-shaped guide rib is contacted closely with the flat surfaces of the bosses. When the superposed portions of the front block and the rear block are clamped with screws in this state, the longitudinal positions of the blocks are fixed by engaging the flange with the groove. The elevational positions of the blocks are fixed by the upper flat surface of the bosses and the flat downward surfaces of the guide rib, and the lateral positions of the blocks are further fixed by clamping with screws.

BRIEF DESCRIPTION OF THE DRAWINGS

The above and other related objects and features of the invention will be apparent from a reading of the following description of the disclosurwe found in the accompanying drawings and novelty thereof pointed out in the appended claims.

DESCRIPTION OF THE PREFERRED EMBODIMENTS

This invention will now be described in detail with reference to FIGS. 1(A) and 1(B) to 4 and FIG. 6, which show an embodiment of the console box according to this invention. A console box 1 of this embodiment is divided into a front block 2 secured to an automotive body, and a rear block 3 secured to block 2. The front block 2 and the rear block 3 are integrally coupled by a coupling structure to be described below, provided on the front surfaces of the openings 4 and 5 thereof.

Figure 1A:
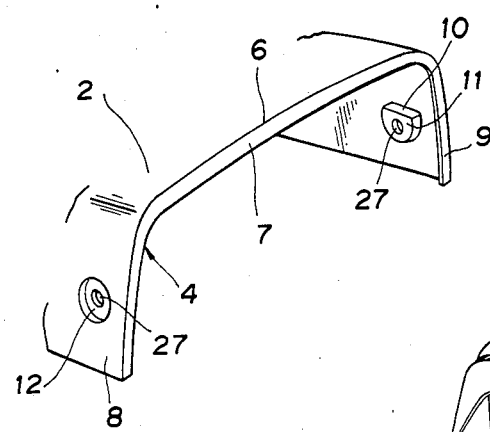
FIG. 1(A) is an exploded perspective view of the front block of an embodiment of a console box for an automobile according to this invention.
Figure 3:
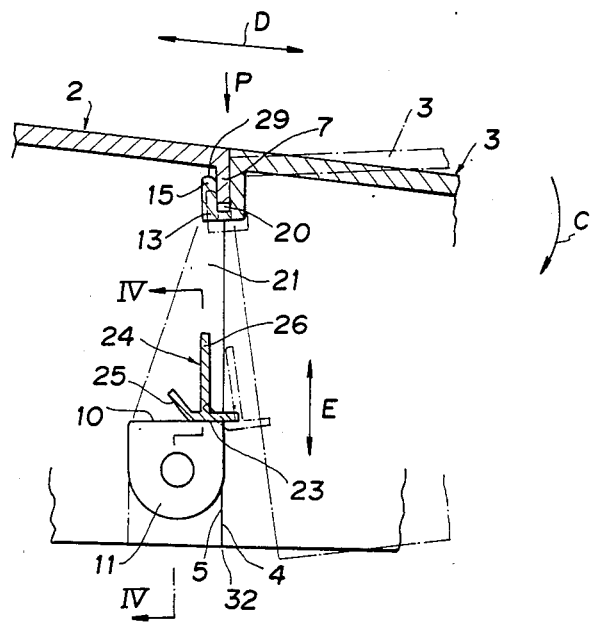
FIG. 3 is a longitudinal sectional view showing the assembling structure of the console box.
Figure 4:
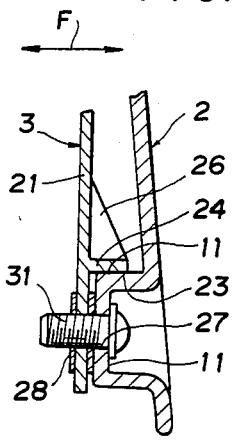
FIG. 4 is an enlarged sectional view taken along the line IV—IV in FIG. 3.
Figure 5A:
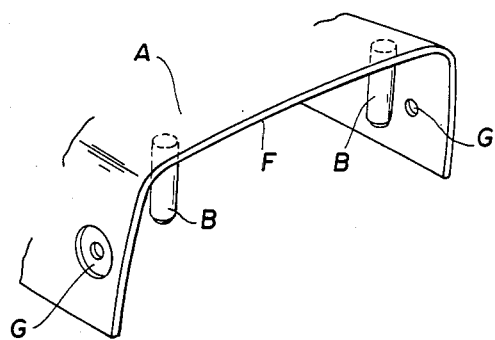
FIGS. 5(A) and 5(B) are exploded perspective views of the front and rear blocks of the conventional console.
Figure 5B:
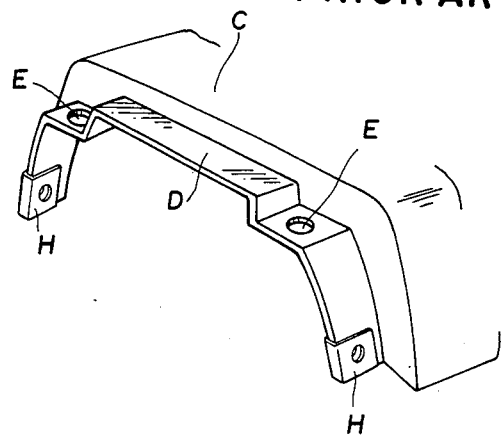
Figure 6:
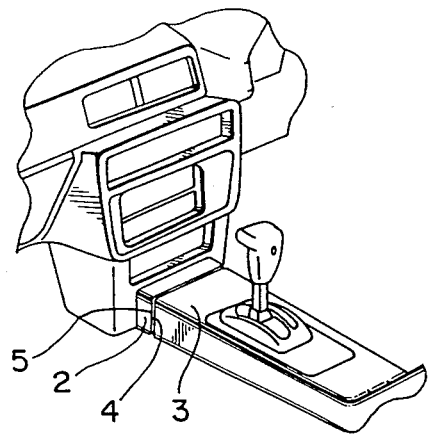
FIG. 6 is a partial perspective view of an embodiment of the console box in accordance with the present invention, shown in a typical installation.

An inward flange 7 is formed at the peripheral edge of opening 4 of the front block 2 secured to the body. As shown in FIGS. 1(A) and 3, bosses 11 and 12 having upper flat surfaces 10 substantially parallel with the ceiling surface of the block 1 project inwardly of block 2. An extending flange 13 is formed coextensive with the entire inner periphery of the opening 4 and the flange 7 (a coupling edge) of the front block 2, in the opening 5 of the rear block 3 secured to the front block 2. Rising pieces 15 and 16 which project upwardly from the edge 14 of flange 13 are provided. An upward groove 20 is formed between the rear surfaces of the rising pieces 15 and 16 and the front surface 17 of the opening 5 for engaging the flange 7 of the block 2.

Figure 1B:
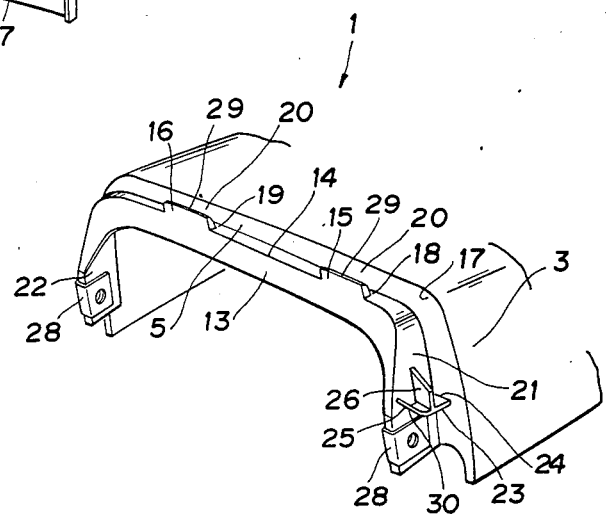
FIG. 1(B) is an exploded perspective view of the rear block of an embodiment of the console box of the invention.
Figure 2:
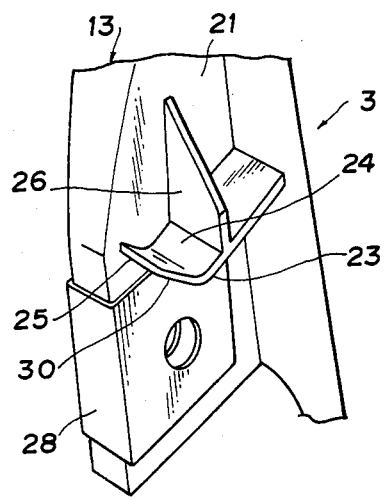
FIG. 2 is an enlarged perspective view of the guide rib of the rear block.

An L-shaped guide rib 23 having a downward flat portion at the rear is projected, as shown in FIGS. 1(B) and 2, from the outer surfaces of the side walls 21 and 22 at both sides of the flange 13.

The guide rib 24 has a guide piece 25 inclined upwardly at the front end, and a reinforcing rib 26 rising upwardly from the rib 24 along the side wall 21.

The guide rib 24 projects at a position to be contacted with the upper flat surface 10 of the boss 11 of the block 2 at the downward flat portion 23 of the rib 24 when the downward flange 7 of the block 2 is closely engaged within the upward groove 20 as will be described in detail.

Case nuts 28 are respectively secured to the positions corresponding to the threaded holes 27 of the bosses 11 of the skirt portions 8 and 9 of the block 2 at the side walls 21 and 22.

The upper edges of the rear faces 18 and 19 of the rising pieces 15 and 16 of the flange 13 of the block 3 are formed in a round shape with arcuate edges 29, and the outer corner of the guide piece 25 of the guide rib 24 is formed in a rounded shape with an arcuate edge 30.

The blocks 2 and 3 of the structure described above are coupled by the following sequence.

As shown in FIG. 3, the front block 2 is secured to the automotive body side by known means (not shown). The rear block 3 is tilted slightly forwardly as shown by a chain line 3 in FIG. 3 in the opening 4, and contacted with the opening 5. The lower end of the flange 7 of the block 2 is opposed to the upward groove 20. The guide piece 25 of the guide rib 24 of the block 3 is opposed to the upper flat surface 10 of the boss 11 of the block 2, and the block 3 is then rotated in a direction of an arrow C in FIG. 3.

When the block 3 is turned in the direction of the arrow C, the lower end of the flange 7 is guided to the arcuate edges 29 of the rear ends 18, 19 of the rising pieces 15, 16, engaged smoothly within the upward groove 20, and the guide rib 24 is smoothly slid on the inner surfaces of the skirt portions 8, 9 of the block 2 by the operation of the edge 25 of the outer corner of the guide piece 25 so that the guide piece 25 rides on the upper flat surface 10 of the boss 11.

When the block 3 is further turned in the direction of the arrow C, the flange 7 of the block 2 is closely engaged within the upward groove 20 of the block 3 as shown by solid lines in FIG. 3, and the downward flat portion 23 of the guide rib 24 of the block 3 rises on the upper flat portion 10 of the boss 11 of the block.

After the block 3 is further turned in the direction of the arrow C and the openings 4, 5 of both blocks 2, 3 are closely contacted, both blocks 2, 3 are secured by a screw 31 by means of the threaded hole 27 of the boss 11 of the block 2 and the case nut 28 of the block 3, to complete the coupling of the consle box 1.

Since the coupling structure of the console box described above is thus constructed, even if a pressing force acts in the direction designated by reference character P in FIG. 3, the force is supported by the flat downward portion 23 of the rib 24 and the upper flat surface 10 of the boss 11. No positional difference is produced between the lower end 32 of the surface of the flange 7 of the opening 4 of the block 2 and the front surface 17 of the opening 5 of the block 3 along the coupling line.

The longitudinal position (in the direction designated by an arrow D in FIG. 3) is determined in the embodiment exemplified in FIG. 3 by the close engagement of the flange 7 with the upward groove 20.

The elevational position (in the direction designated by an arrow E in FIG. 3) is determined by the close engagement of the upper flat surface 10 of the boss 11 with the downward flat portion 23 of the guide rib 24.

Further, the lateral position (in the direction designated by an arrow F in FIG. 4) is determined by the engagement of the screw 31 at the lateral position.

Since the extending flange 13 is formed at the block 3 and the guide rib 24 and the case nuts 28 are provided at the walls 21, 22, the rigidity of the coupling portion of the blocks 2, 3 is improved.

According to the present invention as described above, the console box is constructed and operated as above, the longitudinal, elevational and lateral positioning and securing of the blocks can be simply and readily performed by means of engagement of the downward flange with the upward groove, close contacting of the upper flat surface of the boss with the downward flat portion of the guide rib and the screw clamping of the openings, thereby enhancing productivity by improving the efficiency in assembling the console box.

Further, the rigidity of the coupling of the blocks of the console box is also improved.

I claim:

1. A console box divided into front and rear blocks for an automobile comprising:
    a front block secured to an automotive body;
    a rear block coupled with said front block;
    a flange formed on a rear edge of said front block;
    at least one boss formed on an inner surface of said front block having an upper flat surface lying in a generally horizontal plane;
    an extending flange formed on a front edge of said rear block;
    a groove formed on an upper surface of said extending flange for engaging with the flange of said front block;
    at least one guide rib formed on said rear block having a surface contacting with said upper surface of said at least one boss, wherein
    said front and rear blocks of the console box are integrally coupled in position by engaging the flange with the groove, and contacting the upper flat surface of the at least one boss with the surface of the at least one guide rib.

2. The console box according to claim 1, wherein said at least one guide rib comprises a guide piece inclined upwardly toward a front end thereof and a reinforcing rib rising upwardly from said rib along a side wall of said rear block.

3. The console box according to claim 1, wherein said side wall is secured with at least a case nut at a position corresponding to a threaded hole in said at least one boss.

4. The console box according to claim 1, wherein an outer end corner of the guide piece of said guide rib is formed with an arcuate edge.

5. The console box according to claim 1, wherein said extending flange is formed coextensively with a coupling edge of the front block.

6. The console box according to claim 1, wherein said groove is formed between a rising piece projecting upwardly from a front end of said extending flange and an edge surface of said rear block.

7. The console box according to claim 6, wherein an upper edge of a rear end of said rising piece is formed with an arcuate edge.

8. The console box according to claim 1, wherein two bosses are formed on said inner surface of said front block and two guide ribs are formed on said rear block contacting with the upper surfaces of said bosses.

* * * * *